Feb. 8, 1938. W. A. HOLLINGSWORTH 2,107,533
AUTOMOBILE SIGNAL
Filed Oct. 19, 1936
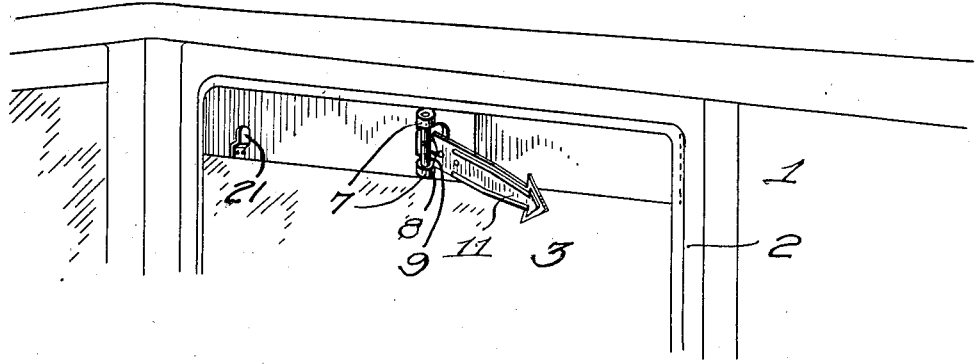
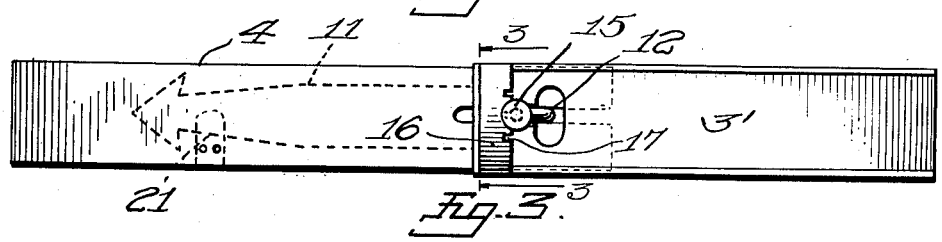
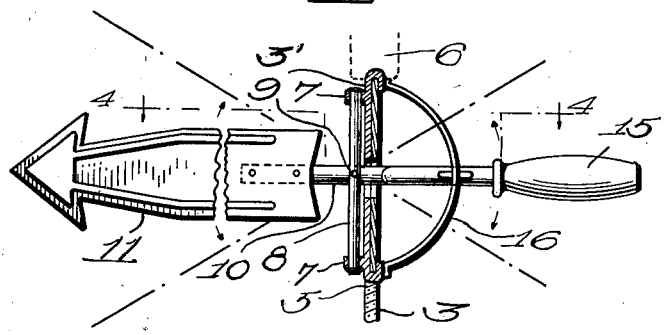
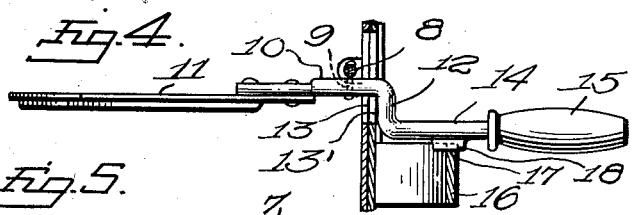
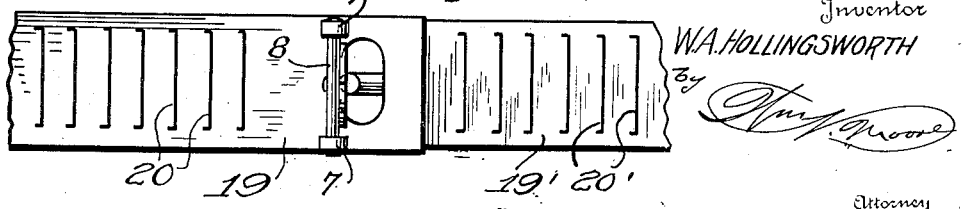
Inventor
W.A. HOLLINGSWORTH
By
Attorney Patented Feb. 8, 1938

2,107,533

UNITED STATES PATENT OFFICE 2,107,533

AUTOMOBILE SIGNAL

William A. Hollingsworth, Puente, Calif.

Application October 19, 1936, Serial No. 106,444

1 Claim. (Cl. 116—52)

My invention relates to improvements in automobile signals, and refers particularly to a manually operated and controlled signal which can be instantly placed in position for use and retained in place by the usual sliding window of the automobile, and which can be quickly removed when desired and thus produce a portable signal.

Another object of my invention is the provision of a portable manually operated and controlled signal which may be quickly applied or removed; which will be capable of being telescoped to occupy a very small amount of space; and which will be entirely out of the way of the driver but which can be easily moved to the desired positions to indicate stop and left or right turn.

Another object of my invention is the provision of an automobile signal which will prove highly efficient and desirable in cold or stormy weather in that closing of the windows of the automobile will be permitted while not in the least interfering with the proper operation of the signal.

Another object of my invention is the provision of an automobile signal which can be operated with ease for the intended purpose and which will prove a useful and necessary accessory because of its portability, its small size and light weight, its ease of application and removal and by reason of the fact that it can be made and sold for a very small price.

With these objects in view my invention consists of an automobile signal of the character stated embodying novel features of construction and combination of parts, substantially as described and claimed and as shown in the accompanying drawing, in which:

Figure 1 represents a perspective view of a part of an automobile showing my automobile signal in applied position with reference to the window and door.

Figure 2 represents a view in side elevation of the signal looking from the inside.

Figure 3 represents a sectional view of the signal taken on line 3—3 of Figure 2.

Figure 4 represents a sectional view taken on the line 4—4 of Figure 3, and

Figure 5 represents a front elevation of the signal showing the pair of telescoping members formed with slits or slots to provide for ventilation.

Referring by numerals to the drawing in which the same numbers of reference are used to denote the same parts in all the views of the drawing:

The numeral 1 designates the body of the automobile, 2 the door and 3 the sliding window mounted in the door and which as will presently appear serves to hold my signal in place during its service.

The signal proper is of extremely simple construction and comprises the flanged section 3', and the flat section 4, which fits and is slidable in the section 3', and the sections are fitted in the door opening and retained when in use, as shown in Figures 1 and 3 by the upper edge 5, of the window and the casing 6, of the door, which serve to hold the signal in proper place.

The flanged section 3' is provided on its outer face with a pair of lugs 7, in which pivots the rod 8, and intermediate the length of said rod by means of the pin 9, is pivotally connected the outer end of the lever 10, which carries the vane or signal arm 11, and which lever has the bent or curved intermediate portion 12, passing through the openings 13 and 13', respectively of the flanged member and the flat member or section of the signal, and the inner offset end 14, of the lever is provided with a handle 15, for convenient manual operation and control of the signal.

From the construction shown and described it will be understood that the signal is retained in place by the window and door frame or casing and is disposed near the top of the door and forms a complete closure to prevent entrance of wind or snow or rain, but the handle is disposed on the inside where the driver can by movement of the handle place the lever with the signal arm or vane in the desired position to indicate that the machine will stop or move to the left or right, the lever through its connection with the pivoted rod 8, having a vertical as well as a horizontal movement, and to retain the lever and signal arm in the desired place, I have mounted on the rear of the flanged section the segmental plate 16, formed with the series of notches or recesses 17, adapted to be engaged by the lug 18, on the inner end of the lever and which serves to hold the signal arm in the three vertical positions, upper, central and lower by the engagement of lug 18 with the recesses 17 of the vertically disposed segmental or curved plate 16. Also that the signal arm by reason of the pivot 9, on the pivoted pin 8, permits the said arm to swing horizontally to place said arm out of use.

In the form of my invention shown in Figure 5, the two sections 19 and 19', are provided with slots 20 and 20', which serve to permit entrance and exit of air to provide for ventilation, and this form will prove desirable under certain conditions.

From the foregoing description taken in connection with the drawing it will be apparent that I provide a cheap, durable, simple and attractive automobile signal which can be easily and quickly applied and removed and which takes up a very small amount of space and which provides a perfect guard against the damaging influence of the weather and which can be readily operated and controlled by the driver to indicate the direction and stopping of the vehicle and to retain the signal arm closed, the clip or latch keeper 21, is provided.

I claim:

The automobile signal herein shown and described, comprising a pair of sections slidably fitted together, a pair of vertically disposed lugs at the inner end of one of said sections, a pin pivotally mounted in said lugs, a vertically arranged segmental plate on the back of one of said sections provided with a series of recesses, a shaft pivoted to said pin intermediate of its length, a signal arm carried by the outer end of said shaft, said shaft having its inner end offset, a handle on said offset end and a lug depending from said offset end of the shaft to engage one of the recesses in the segmental plate to adjust the signal arm to the desired vertical position.

WILLIAM A. HOLLINGSWORTH.